United States Patent [19]

Justice

[11] Patent Number: 5,152,389
[45] Date of Patent: Oct. 6, 1992

[54] CURVILINEAR HAULAGE SYSTEM

[75] Inventor: James C. Justice, Beckley, W. Va.

[73] Assignee: Coaltex, Inc., Beckley, W. Va.

[21] Appl. No.: 772,669

[22] Filed: Oct. 7, 1991

[51] Int. Cl.⁵ .............................. B65G 41/00
[52] U.S. Cl. ................... 198/303; 198/594; 198/839
[58] Field of Search ........... 198/303, 594, 588, 861.2, 198/839

[56] References Cited

U.S. PATENT DOCUMENTS

| | | | |
|---|---|---|---|
| 1,920,500 | 8/1933 | Garcia et al. | 198/861.2 X |
| 2,128,309 | 8/1938 | Madeira | 198/861.2 |
| 2,674,364 | 4/1951 | Cartlidge | 198/594 X |
| 2,733,806 | 1/1951 | Lanier | 198/139 |
| 2,850,147 | 9/1958 | Hill | 198/303 |
| 2,851,150 | 9/1958 | Boersma | 198/303 |
| 3,191,754 | 6/1965 | Heimaster et al. | 198/303 |
| 3,253,698 | 5/1966 | Murphy | 198/839 X |
| 3,279,584 | 10/1966 | Towles | 198/303 |
| 3,856,133 | 12/1974 | Dyachkov | 198/839 X |
| 3,863,752 | 2/1975 | Sibley | 198/303 |
| 4,120,535 | 10/1978 | Delli-Gatti | 299/18 |
| 4,339,031 | 7/1982 | Densmore | 198/864 |
| 4,461,378 | 7/1984 | Roth | 198/839 X |
| 4,565,285 | 1/1986 | Koistinen | 198/819 |
| 4,771,881 | 9/1988 | Roberts | 198/861.1 |
| 4,784,257 | 11/1988 | Doerr | 198/594 |
| 4,896,764 | 1/1990 | Neunzert | 198/812 |
| 4,957,405 | 9/1990 | Roberts et al. | 414/339 |
| 5,056,655 | 10/1991 | Justice | 198/303 X |

FOREIGN PATENT DOCUMENTS

| | | | |
|---|---|---|---|
| 1126311 | 3/1962 | Fed. Rep. of Germany | 198/594 |
| 2252267 | 7/1975 | France | 198/839 |
| 0583329 | 12/1977 | U.S.S.R. | 198/594 |
| 1234295 | 5/1986 | U.S.S.R. | 198/839 |

Primary Examiner—Robert P. Olszewski
Assistant Examiner—James R. Bidwell
Attorney, Agent, or Firm—Nixon & Vanderhye

[57] ABSTRACT

Mined material, such as coal, is transported in a curvilinear path. An endless conveyor belt is mounted by a string of wheeled cars having upper and lower sets of rollers. The cars are positioned at a sharp turn connecting first and second paths extending between a mine bore and a remote area. The cars positioned at the sharp turn reorient the conveyor belt from a generally horizontal position to a generally vertical position and back to a generally horizontal position. The mined material is moved off the conveyor belt before reorientation, at a location between the sharp turn and the mine bore. The cars have first and second sets of wheels with the frames pivotally connected between the wheels, for pivotal movement about an axis parallel to the axes of the wheels. Coupling elements connecting the cars together provide a universal joint action.

20 Claims, 5 Drawing Sheets

CURVILINEAR HAULAGE SYSTEM

BACKGROUND AND SUMMARY OF THE INVENTION

The invention relates to a method and apparatus for conveying mined material from a mine bore to a remote area along a curvilinear path. A conveyor belt is a very useful mechanism for conveying mined material since it can convey it quickly and efficiently, however when the conveyor has to make sharp turns it usually no longer is practical in many situations. It has been extremely impractical to provide continuous support for advancement of the conveyor belt with the mining head into a mine bore and at the same time provide conveyance of the material by a conveyor belt past sharp turns, utilizing simple equipment.

According to the present invention, it is possible to effectively convey, utilizing simple apparatus, mined material from a mine bore utilizing an endless conveyor belt which is continuously supported by articulated wheeled cars which can be advanced into the bore following the mining head. That is according to the present invention it is possible to provide effective mining utilizing a conveyor belt as a transporting mechanism, such as shown in U.S. Pat. Nos. 4,120,535 and 5,056,655 (the disclosures of which are hereby incorporated by reference herein) even when there are sharp turns in the path between the mine bore and an area remote from the mine bore.

According to one aspect of the present invention, a method of transporting mined material from a mine bore utilizing an endless belt conveyor, a plurality of articulated wheeled cars for supporting the conveyor belt, and a belt unloader, is provided. The method comprises the following steps: (a) Pulling a string of the articulated wheeled cars, supporting the endless conveyor belt, into the mine bore, along a generally straight first path from an area remote from the mine bore, then making a sharp turn, and then into the mine bore through the mine bore mouth along a straight second path making an angle of greater than about 90° and less than about 180° with respect to the first path. (b) Operating the conveyor belt so that it continuously moves between a mining area within the mine bore, and the remote area. (c) Continuously conveying mined material from the mine bore with the conveyor belt along the second path to the bore mouth. (d) Moving the mined material off of the conveyor belt adjacent the mine mouth to convey it in a third straight path making an angle of greater than about 90° and less than about 180° with respect to the second path, so that when the conveyor belt makes the sharp turn it is not conveying mined material. And, (e) accommodating lengthening of the second path, as necessary, by adding wheeled cars to the string of cars at the remote area.

Steps (a)-(e) are preferably practiced by positioning wheeled cars in the string at the sharp turn so that successive cars are positioned so as to gradually change from a first position in which the belt is disposed horizontally, to a second position in which the belt is disposed vertically, into a third position in which the belt is again disposed horizontally. Step (d) is also preferably practiced by providing a vertical plate with a flexible bottom edge disposed in a plane parallel to or coincident with the third path above the conveyor belt, so that as mined material engages the belt under the force of conveyance it is deflected off the belt, by the vertical plate, into the third path. Preferably the first and third straight paths are parallel to each other.

The invention also comprises an apparatus for conveying mined material from a mine bore to a remote area, distinct from the mine bore, along a first path and a second path, a sharp turn connecting the paths. The apparatus comprises the following elements: An endless conveyor belt having a conveying portion, and a return portion, the conveying and return portions constantly changing during movement of the conveyor belt. Means for driving the endless conveyor belt so that the conveying portion thereof moves to convey mined material supported thereon. A plurality of wheeled cars, each car having an upper plurality of rollers for supporting the conveying portion of the endless conveyor belt, and a lower plurality of rollers for supporting the return portion of the conveyor belt. Means for positioning some cars at the sharp turn so as to turn the conveying portion of the conveyor belt from a generally horizontal position, to a generally vertical position, and back to a generally horizontal position. And, means for moving mined material off the conveyor belt conveying portion at a location between the sharp turn and the mine bore.

Preferably the cars have at least two wheels rotatable about an axis, and at least some of the wheeled cars comprise a pair of side frame members, and means for pivotally connecting the frame members together for rotation about an axis parallel to the wheel axis. At least some of the wheeled cars have front and rear end frame members with coupling elements extending outwardly from them, the coupling elements on adjacent cars engaging each other to provide for relative pivotal movement of coupled cars about both horizontal and vertical axes. The means for positioning some cars at the sharp turn preferably comprises a ramp for engaging the wheels of the cars, the ramp contoured so that it extends from a generally horizontal position to a generally vertical position and back to a generally horizontal position, and a plurality of positioning rollers mounted in cooperating spaced relationship with the ramp for engaging the conveyor belt at the wheeled car so as to facilitate guiding movement of the conveyor belt, in contact with the cars, at the sharp turn.

The means for moving mined material off the conveyor belt preferably comprises a stationary generally vertical plate extending at an angle with respect to the moving conveyor of about 90°-180°, and having a flexible material bottom edge; and means for mounting the plate above the conveying portion of the conveying belt between the mine bore mouth and the sharp turn for engaging mined material on the belt and deflecting it to another path generally parallel to or coincident with the generally vertical plate. A bridge conveyor and a conveyance mechanism distinct from the conveyor belt are also preferably provided, the conveyance mechanism extending from the bridge conveyor toward the remote area, and the bridge conveyor extending between the conveyor belt at the generally vertical plate and the conveyance mechanism.

According to the another aspect of the present invention a conveyor belt supporting car is provided. The car comprises: A frame having first and second side elements, a front element, and a rear element. First and second sets of wheels. Means defining a first axis for rotation of the first set of wheels, and a second axis for rotation of the second set of wheels, the first and second axes parallel to each other and spaced from each other along the side frame elements. Means defining a pivotal connection between the first and second side elements so that the elements may pivot with respect to each other about a third axis parallel to the first and second axes. First and second sets of rollers extending upwardly from the frame elements, one associated with each of the first and second frame elements, the rollers rotatable about axes generally parallel to the first and second axes. And, third and fourth sets of rollers extending downwardly from the frame elements, one associated with each of the first and second frame elements. The car also preferably comprises coupling elements, including a first coupling element extending outwardly from the front frame element, and a second coupling element extending outwardly from the rear frame element. The first and second coupling elements constructed so that when first and second coupling elements of adjacent cars are connected together, the cars are pivotally movable with respect to each other about perpendicular horizontal axes.

It is the primary object of the present invention to provide for the simple and effective conveyance of mined material with a conveyor belt even through sharp turns. This and other objects of the invention will become clear from the detailed description of the invention, and from the appended claims.

DETAILED DESCRIPTION OF THE DRAWINGS

Figure 1:
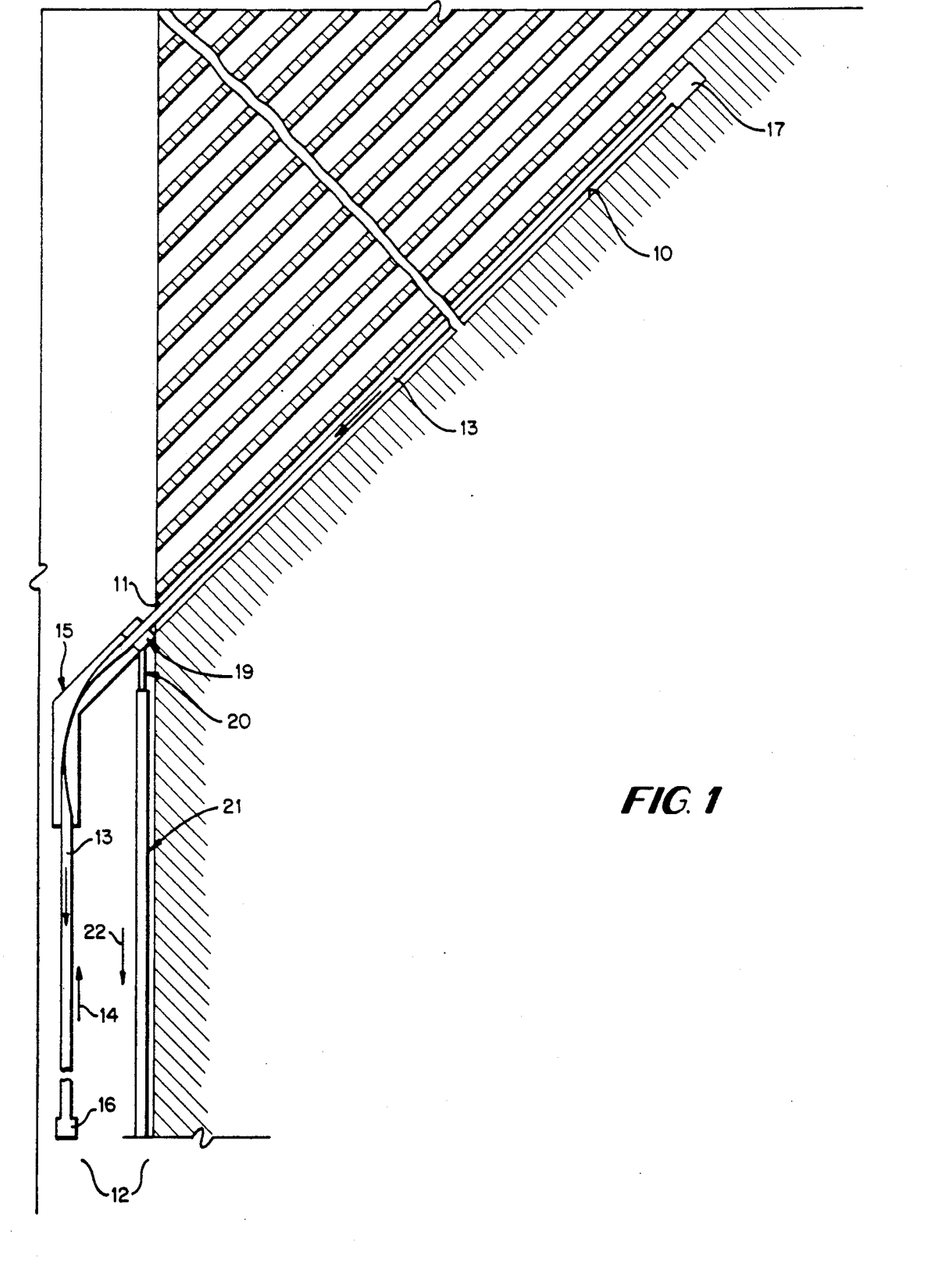
FIG. 1 is a schematic plan view illustrating the practice of the method according to the invention utilizing apparatus according to the invention.

FIG. 1 schematically illustrates operation of the apparatus according to the invention to practice the method of transporting mined material according to the invention. According to the invention mined material, such as coal, is transported from a mine bore 10, through the mine bore mouth 11, ultimately to a remote area 12. An endless conveyor belt 13 conveys the mined material from the conventional mining head 17. The conveyor belt 13 extends from the remote area 12 along a generally straight first path 14, makes a sharp turn at 15, and then extends along a generally straight second path in the mine bore 10. At the remote area 12, a conventional belt take-up, let out unit 16 is provided, such as shown in U.S. Pat. Nos. 4,120,535 and 5,056,655, the disclosures of which are hereby incorporated by reference herein.

Note that a sharp turn 15 has an angle, from the second path 10 to the first path 14, of greater than about 90° and less than about 180°. Typically turn 15 has an angle of between about 100° and 170°.

As also illustrated in FIG. 1, between mine mouth 11 and the sharp turn 15 there is means 19 for moving mined material off the conveyor belt 13, and a bridge conveyor 20 and another conveyance mechanism 21 which conveys the material in a third straight path 22 away from the mine mouth 11. As illustrated in FIG. 1, the paths 14, 22 preferably are parallel to each other. The path 22 also makes an angle of greater than 90° and less than 180° with respect to the bore 10, typically between 100° and 170°.

In order to support the conveyor belt 13, including while it is being advanced into the bore 10 behind the mining head 17, a plurality of articulated wheeled cars 25 are provided. The cars are seen in FIGS. 2A–5.

Each car 25 preferably comprises (see FIGS. 3 through 5 in particular) a frame having first side elements 26, second side elements 27, a front element 28, and a rear element 29. Preferably the side elements 26 are integral with the front element 28, and the side elements 27 are integral with the rear element 29. The frame elements are preferably made of steel or like rigid durable material. The first and second elements 26, 27 each support an axle 30, 31, respectively, the axles in turn supporting a first set of wheels 32, and a second set of wheels 33. The axles 30, 31 define axes of rotation that are parallel to each other, and parallel to the general orientation of the front and rear elements 28, 29, and perpendicular to the general orientation of the side elements 26, 27. The wheels 32, 33 can have pneumatic tires, or be rail-engaging.

Figure 3:
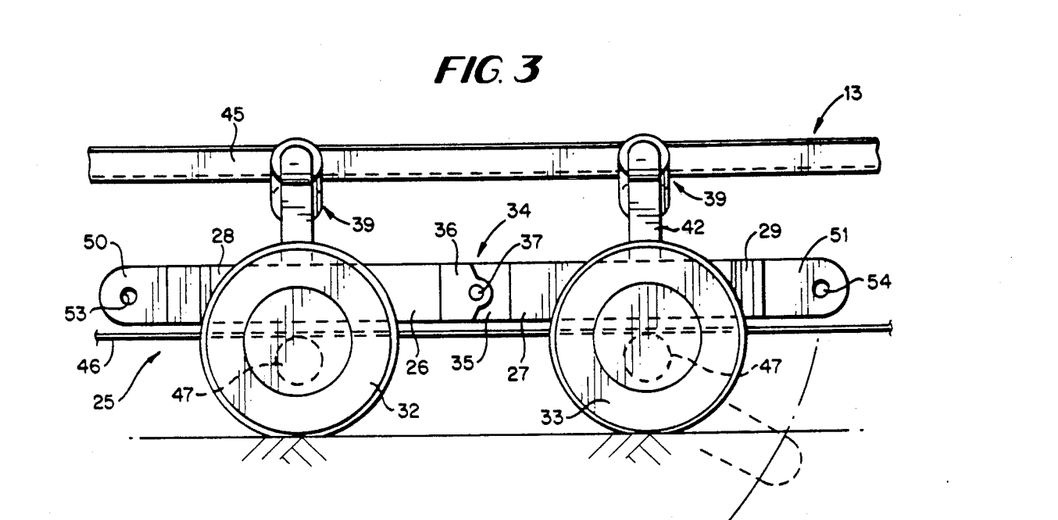
FIG. 3 is a side view of an exemplary wheeled car according to the invention.
Figure 4:
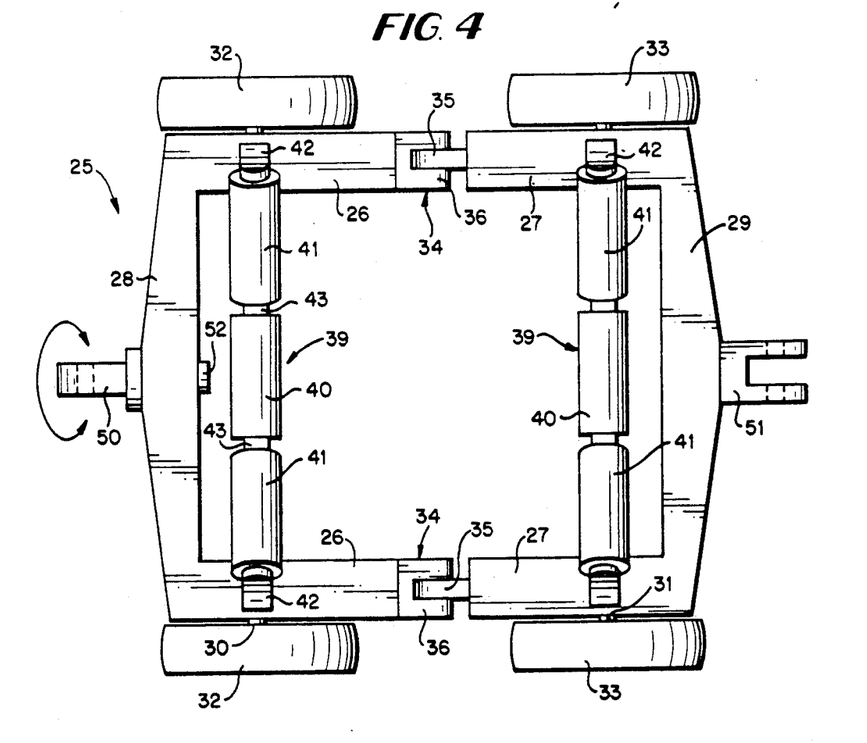
FIG. 4 is a top plan view of the wheeled car of FIG. 3.

Connecting the side elements 26, 27 together are means defining a pivotal connection, shown generally by reference numeral 34 in FIGS. 3 and 4. In the exemplary embodiment illustrated in the drawings, the pivotal connection means 34 comprises a pair of extensions 35 of the frame elements 27 received by a channel defining extension 36 of the side elements 26, and a pivot pin 37 connecting the components 35, 36 together. The pins 37 are parallel to the axes of rotation (axles 30, 31) of the wheels 32, 33.

Figure 5:
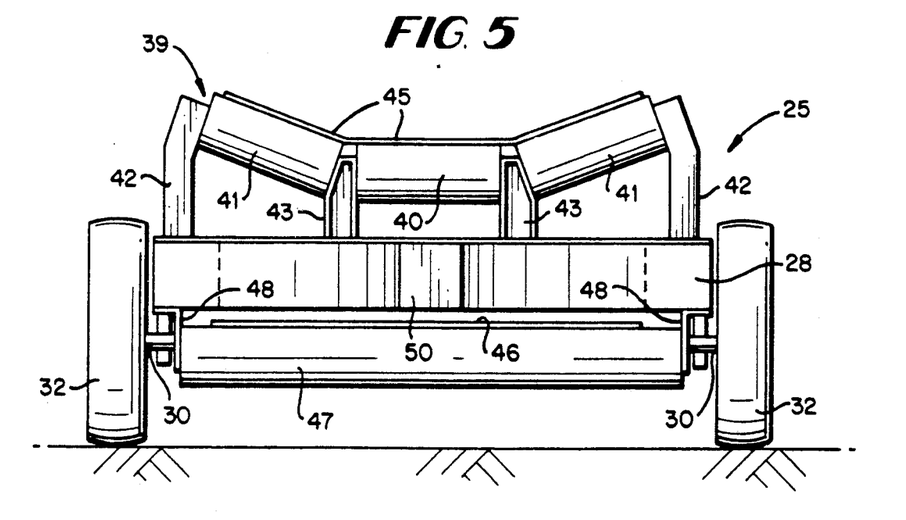
FIG. 5 is a front view of the car of FIGS. 3 and 4.

The cars 25 have first and second sets of rollers for supporting the conveyor belt 13. The first set of rollers are shown generally by reference numeral 39 in FIGS. 3 through 4, and preferably comprise trough roller sets, including a bottom roller 40 and two angled rollers 41 extending upwardly from each of the bottom rollers 40, with the axes of rotation of the rollers 40, 41 preferably in a common vertical plane. The rollers 41 are preferably mounted for rotation about an axis between about 1° and 89° with respect to the horizontal axis of rollers 40, typically about 15° as illustrated in FIG. 5. The rollers 40, 41 are mounted for rotation about axles (not shown) which are mounted at the ends thereof by the vertical supports 42, 43. As illustrated in FIGS. 3 and 4, preferably two sets of upper rollers 39 are provided, one associated with each of the side elements 26, 27.

While it is preferred that roller mechanisms such as illustrated at 39 be utilized, a roller arrangement such as illustrated in FIG. 3B of U.S. Pat. No. 4,120,535 may be utilized instead.

The trough roller sets 39 support the upper, conveying portion 45 of the conveyor belt 13. For supporting the return portion 46 (see FIGS. 3, 5, and 6) of the conveyor belt 13, a lower set of rollers 47 is provided. The rollers 47 are rotatable about horizontal axes parallel to the axles 30, 31 and the pivot pins 37, the lower rollers 47 supported underneath each of the side elements 26, 27 by brackets 48 (see FIG. 5).

The cars 25 also comprise coupling elements including a first coupling element 50 extending outwardly from the front frame element 28, and a second coupling element 51 extending rearwardly from the rear frame element 29. When the elements 50, 51 are connected together they form a universal joint, so that adjacent cars are pivotally movable at least a small amount with respect to each other about perpendicular horizontal axes. Any type of conventional connector may be provided for allowing at least limited pivotal movement of the elements 50, 51 with respect to each other about both perpendicular horizontal axes. For example, the element 50 may be mounted on a shaft 52 (see FIG. 4) which is journalled in the front frame element 28 for rotation about a horizontal axis perpendicular to the axles 30, 31 while a pivot pin (not shown) extending between openings 53 in male element 50, and 54 in female element 51, provides for pivotal movement about a horizontal axis parallel to the axles 30, 31.

Figure 2A:
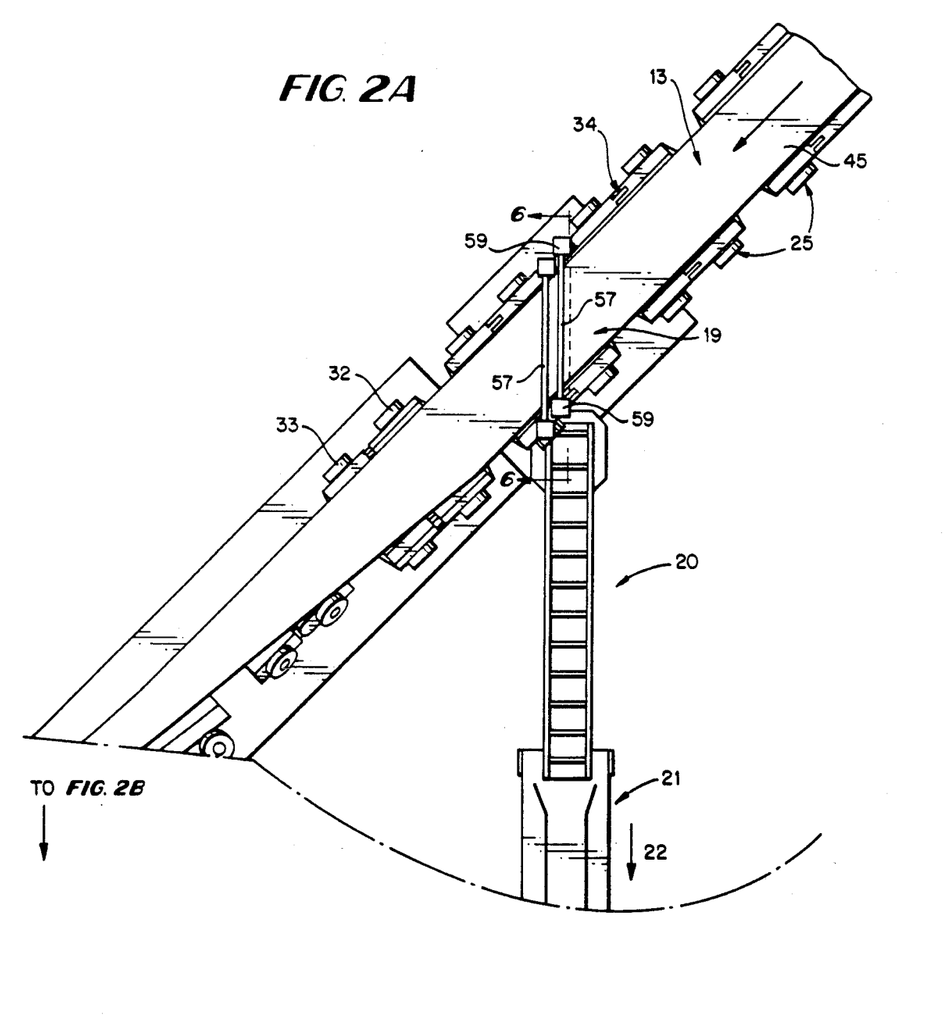
FIGS. 2A and 2B are top plan detail views showing the conveyor belt, wheeled cars, and other conveyance mechanisms at the sharp turn from one straight path to the other in FIG. 1.
Figure 6:
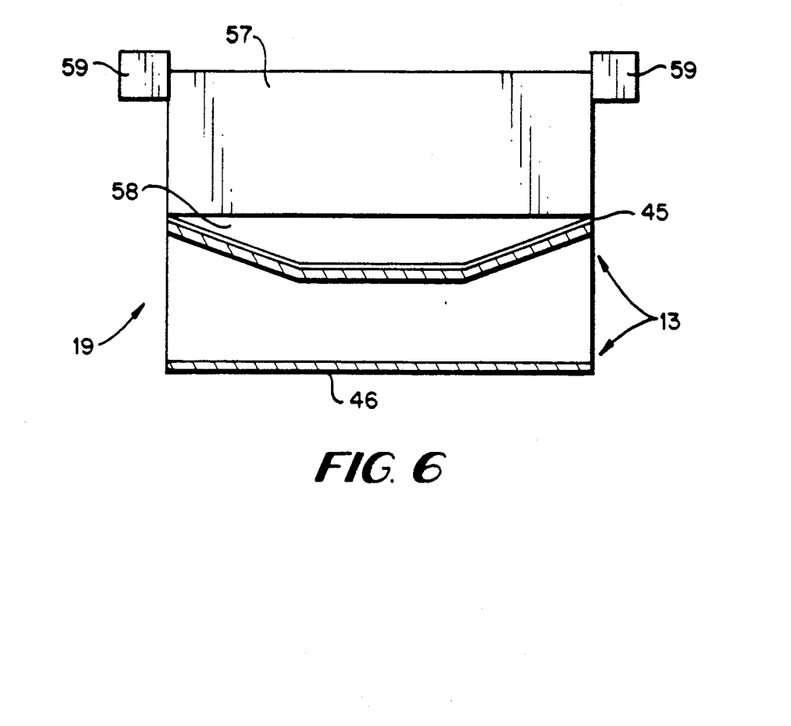
FIG. 6 is a sectional view taken at line 6—6 of FIG. 2A, with the car removed for clarity of illustration.

The mechanism 19, for moving mined material off of the conveyor belt 13 conveying portion 45, is seen in FIGS. 2A and 6. The structure 19 is conventionally called a belt unloader, or "unloading station" and is available from Joy Manufacturing Company. It comprises one or more plates 57 which are each disposed in a generally vertical plane, with a flexible material (e.g. rubber) bottom portion or edge 58 which contacts the conveying portion 45 of the conveyor belt 13. Each plate 57 is mounted by stationary mounting elements, shown schematically at 59 in FIGS. 2A and 6, so that it is in a generally vertical plane, with the flexible bottom portion or edge 58 engaging the conveying portion 45 of the conveyor belt 13. A number of plates 57 may be provided in case some mined material gets past the first plate.

The belt unloading means 19 deflects or wipes clean the mined material being conveyed by the belt surface 45, transferring it to the bridge conveyor 20. The second conveyance mechanism 21, connected to the opposite end of the bridge conveyor 20 from the unloading means 19, may comprise any suitable conveyor, but preferably comprises another conveyor belt assembly extending in the third path 22 and conveying the mined material from the conveyor belt 13 between the mine mouth 11 and the sharp turn 15, to the remote area 12.

Figure 2B:
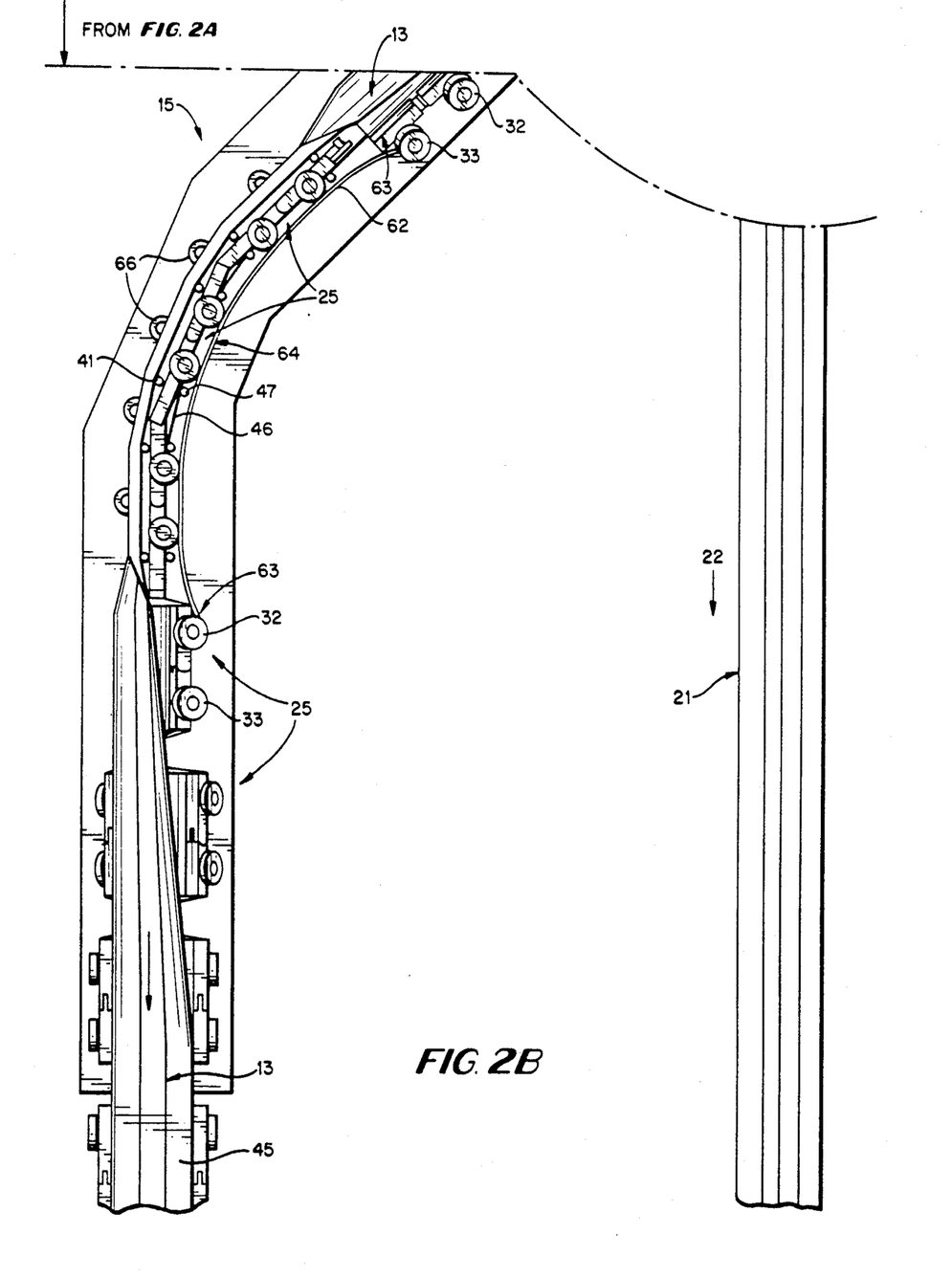

According to the invention, the sharp turn 15 is accommodated by means for positioning some cars 25 at the sharp turn 15 so as to turn the conveying portion 45 (and return portion 46) of the belt 13 from a generally horizontal position, to a generally vertical position, and back to a generally horizontal position. Such positioning means preferably comprises—as seen in FIG. 2B, a metal ramp 62 on which the wheels 32, 33 of the cars 25 are disposed, the ramp 62 being contoured so that it moves from a substantially flat horizontal portion 63 at the free ends thereof, yet is gradually contoured into a generally vertical orientation a the central portion 64 thereof (FIG. 2B). To make sure that the cars 25 are not turned over, or that the conveyor belt 13 is not detached therefrom, hold down rollers 66 are provided along the entire arcuate extent of the ramp 62, the rollers 66 engaging the conveyor belt 13, and through it the cars 25. Thus the means 62, 66 allow the conveyor belt 13 to negotiate the sharp turn 15 without disruption of the conveying action.

The cars 25, and conveyor belt 13 supported thereby, are pulled into the mine bore 10 by the mining machine 17. As the mining machine 17 advances, it is necessary to add cars 25 to accommodate the added length of conveyor belt 13, which is let out by the take-up/let out unit 16. Additional cars can be added in any desired or conventional manner, such as shown in U.S. Pat. Nos. 4,120,535 and 5,056,655. As the cars are advanced, different cars will assume the orientation and engagement with the ramp 62, the cars being moved very slowly over the ramp 62 (just at the speed of advance of the miner 17), that is at a speed much slower than the speed of the conveyor belt 13. The conveyor belt 13 conveying portion 45 moves in the opposite direction of the movement of the cars 25 when the mining machine 17 is mining. When the mining operation is concluded, the total system backs out of the bore 10 and is ready to begin another bore (see the plurality of bores illustrated in FIG. 1). Typically a tail pulley assembly is attached to the miner 17 connected to the conveyor belt 13 and cars 25, and the conveyor system is pulled out on retreat by a crawler mounted belt drive, as is conventional.

Utilizing the invention it is possible to mine material following a miner with one belt conveyor with fixed centers (500 feet to 1,000 feet, or 1,500 feet, etc.), moving as one unit, discharging the material, and being able to negotiate a turn of almost any degree. The conveyor belt is operated so that it continuously moves between the mining area in bore 10 and the remote area 12, continuously conveying mined material from the mine bore 10 to the bore mouth 11. The mined material is moved off the conveyor belt 13 by the mechanism 19 adjacent the mine mouth 11 to convey it in the third path 22 making a substantial angle with respect to the bore 10. Lengthening of the mine bore 10, as necessary, is accommodated by adding wheeled cars 25 to the string of cars at the remote area 12.

It will thus be seen that according to the present invention an advantageous method and apparatus have been provided for transporting mined material from a mine bore utilizing an endless conveyor belt. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A method of transporting mined material from a mine bore utilizing an endless conveyor belt, a plurality of articulated wheeled cars for supporting the conveyor belt, and a belt unloader, comprising the steps of:
    (a) pulling a string of the articulated wheeled cars, supporting the endless conveyor belt, into the mine bore, along a generally straight first path from an area remote from the mine bore, then making a sharp turn, and then into the mine bore through the mine bore mouth along a straight second path making an angle of greater than about 90° and less than about 180° with respect to the first path;
    (b) operating the conveyor belt so that it continuously moves between a mining area within the mine bore, and the remote area;
    (c) continuously conveying mined material from the mine bore with the conveyor belt along the second path to the bore mouth;
    (d) moving the mined material off of the conveyor belt adjacent the mine mouth to convey it in a third straight path making an angle of greater than about 90° and less than about 180° with respect to the second path, so that when the conveyor belt makes the sharp turn it is not conveying mined material; and (e) accommodating lengthening of the second path, as necessary, by adding wheeled cars to the string of cars at the remote area.

2. A method as recited in claim 1 wherein steps (a)-(e) are practiced by positioning wheeled cars in the string at the sharp turn so that successive cars are positioned so as to gradually change from a first position in which the belt is disposed horizontally, to a second position in which the belt is disposed vertically, and to a third position in which the belt is again disposed horizontally.

3. A method as recited in claim 2 wherein step (d) is practiced by providing a vertical plate with a flexible bottom edge disposed in a plane parallel to or coincident with the third path above the conveyor belt, so that as mined material engages the belt under the force of conveyance it is deflected off the belt, by the vertical plate, into the third path.

4. A method as recited in claim 3 wherein the first and third straight paths are parallel to each other.

5. A method as recited in claim 2 wherein the first and third straight paths are parallel to each other.

6. A method as recited in claim 1 wherein step (d) is practiced by providing a vertical plate with a flexible bottom edge disposed in a plane parallel to or coincident with the third path above the conveyor belt, so that as mined material engages the belt under the force of conveyance it is deflected off the belt, by the vertical plate, into the third path.

7. Apparatus for conveying mined material, from a mine bore having a mine bore mouth, to a remote area, distant from the mine bore mouth, along a first path and a second path, a sharp turn connecting the paths, comprising:

an endless conveyor belt having a conveying portion, and a return portion, the conveying and return portions constantly changing during movement of the conveyor belt;

means for driving the endless conveyor belt so that the conveying portion thereof moves to convey mined material supported thereon;

a plurality of wheeled cars, each car having an upper plurality of rollers for supporting the conveying portion of the endless conveyor belt, and a lower plurality of rollers for supporting the return portion of the conveyor belt;

means for positioning some cars at the sharp turn so as to turn the conveying portion of the conveyor belt from a generally horizontal position, to a generally vertical position, and back to a generally horizontal position; and means for moving mined material off the conveyor belt conveying portion at a location between the sharp turn and the mine bore.

8. Apparatus as recited in claim 7 wherein said cars have at least two wheels rotatable about an axis, and wherein at least some of said wheeled cars comprise a pair of side frame members, and means for pivotally connecting said side frame members together for rotation about an axis parallel to said wheel axis.

9. Apparatus as recited in claim 8 wherein said at least some of said wheeled cars have front and rear end frame members with coupling elements extending outwardly therefrom, and wherein coupling elements on adjacent cars engage each other to provide for relative pivotal movement of coupled cars about both horizontal and vertical axes.

10. Apparatus as recited in claim 9 wherein said at least some of said wheeled cars have four wheels, and four sets of rollers, two wheels and two sets of rollers being provided on each side of said pivotal connection between said side frame members.

11. Apparatus as recited in claim 10 wherein said means for positioning some cars at the sharp turn comprises a ramp for engaging the wheels of the cars, the ramp contoured so that it extends from a generally horizontal position, to a generally vertical position, and back to a generally horizontal position.

12. Apparatus as recited in claim 11 wherein said positioning means further comprises a plurality of positioning rollers mounted in cooperating spaced relationship with said ramp for engaging said conveyor belt at the wheeled cars so as to facilitate guiding movement of the conveyor belt, in contact with the cars, at the sharp turn.

13. Apparatus as recited in claim 12 wherein said means for moving mined material off said conveyor belt comprises a stationary generally vertical plate extending at an angle with respect to said moving conveyor of between about 90° and 180°, and having a flexible material bottom edge; and means for mounting said plate above said conveying portion of said conveying belt between the mine bore mouth and the sharp turn for engaging mined material on the belt and deflecting it to another path generally parallel to or coincident with said generally vertical plate.

14. Apparatus as recited in claim 13 further comprising a bridge conveyor and a conveyance mechanism distinct from said conveyor belt, said conveyance mechanism extending from said bridge conveyor toward the remote area, and said bridge conveyor extending between said conveyor belt at said generally vertical plate and said conveyance mechanism.

15. Apparatus as recited in claim 7 wherein said means for positioning some cars at the sharp turn comprises a ramp for engaging the wheels of the cars, the ramp contoured so that it extends from a generally horizontal position, to a generally vertical position, and back to a generally horizontal position.

16. Apparatus as recited in claim 15 wherein said positioning means further comprises a plurality of positioning rollers mounted in cooperating spaced relationship with said ramp for engaging said conveyor belt at the wheeled cars so as to facilitate guiding movement of the conveyor belt, in contact with the cars, at the sharp turn.

17. Apparatus as recited in claim 7 wherein said means for moving mined material off said conveyor belt comprises a stationary generally vertical plate extending at an angle with respect to said moving conveyor of between about 90° and 180°, and having a flexible material bottom edge; and means for mounting said plate above said conveying portion of said conveying belt between the mine bore mouth and the sharp turn for engaging mined material on the belt and deflecting it to another path generally parallel to or coincident with said generally vertical plate.

18. Apparatus as recited in claim 17 further comprising a bridge conveyor and a conveyance mechanism distinct from said conveyor belt, said conveyance mechanism extending from said bridge conveyor toward the remote area, and said bridge conveyor extending between said conveyor belt at said generally vertical plate and said conveyance mechanism.

19. A conveyor belt supporting car, comprising:
a frame having first and second side elements, a front element, and a rear element;
first and second sets of wheels;
means defining a first axis for rotation of said first set of wheels, and a second axis for rotation of said second set of wheels, said first and second axes parallel to each other and spaced from each other along said side frame elements;
means defining a pivotal connection between said first and second side elements so that said elements may pivot with respect to each other about a third axis parallel to said first and second axes;
first and second sets of rollers extending upwardly from said frame elements, one associated with each of said first and second frame elements, said rollers rotatable about axes generally parallel to said first and second axes; and
third and fourth sets of rollers extending downwardly from said frame elements, one associated with each of said first and second frame elements.

20. A car as recited in claim 19 further comprising coupling elements, including a first coupling element extending outwardly from said front frame element, and a second coupling element extending outwardly from said rear frame element; said first and second coupling elements constructed so that when first and second coupling elements of adjacent cars are connected together, the cars are pivotally movable with respect to each other about perpendicular horizontal axes.

* * * * *